United States Patent
Kroner et al.

(10) Patent No.: US 6,872,848 B2
(45) Date of Patent: Mar. 29, 2005

(54) METHOD FOR PRODUCING ALKYLPOLYALKYLENE GLYCOL ESTERS OF MONOETHYLENICALLY UNSATURATED CARBOXYLIC ACIDS

(75) Inventors: Matthias Kroner, Eisenberg (DE); Jürgen Pfister, Speyer (DE); Dieter Faul, Niederkirchen (DE); Hans-Jürgen Raubenheimer, Ketsch (DE); Karl-Heinz Büchner, Altlussheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/450,529
(22) PCT Filed: Dec. 14, 2001
(86) PCT No.: PCT/EP01/14784

§ 371 (c)(1),
(2), (4) Date: Jun. 20, 2003

(87) PCT Pub. No.: WO02/50160

PCT Pub. Date: Jun. 27, 2002

(65) Prior Publication Data

US 2004/0054218 A1 Mar. 18, 2004

(30) Foreign Application Priority Data

Dec. 20, 2000 (DE) .......................................... 100 63 511

(51) Int. Cl.$^7$ .............................................. C07C 69/63
(52) U.S. Cl. ....................................................... 560/217
(58) Field of Search ............................................ 560/217

(56) References Cited

U.S. PATENT DOCUMENTS 5,037,978 A    8/1991    Mirabelli

FOREIGN PATENT DOCUMENTS

| DE | 25 16 933 | 11/1975 |
|---|---|---|
| DE | 196 02 035 | 7/1997 |
| EP | 0 884 290 | 12/1998 |
| EP | 0 989 108 | 3/2000 |
| EP | 0 989 109 | 3/2000 |
| EP | 1 090 901 | 4/2001 |
| EP | 1090901 A2 * | 4/2001 |

* cited by examiner

Primary Examiner—Rita Desai
Assistant Examiner—Hector M. Reyes
(74) Attorney, Agent, or Firm—Oblon, Spivak, McClelland, Maier & Neustadt, P.C.

(57) ABSTRACT

Alkylpolyalkylene glycol esters of monoethylenically unsaturated carboxylic acids are prepared by esterifying (a) monoethylenically unsaturated carboxylic acids with (b) polyalkylene glycols which are endcapped at one end, in the absence of a solvent and in the presence of polymerization inhibitors and esterification catalysts at not more than 160° C. by a process in which the esterification is first carried out under atmospheric pressure or at up to 50 bar, the water formed in the esterification is then distilled from the reaction mixture at from 10 to 500 mbar and the esterification is then continued under atmospheric pressure or at up to 50 bar.

7 Claims, No Drawings

METHOD FOR PRODUCING ALKYLPOLYALKYLENE GLYCOL ESTERS OF MONOETHYLENICALLY UNSATURATED CARBOXYLIC ACIDS

The present invention relates to a process for the preparation of alkylpolyalkylene glycol esters of monoethylenically unsaturated carboxylic acids by esterifying (a) monoethylenically unsaturated carboxylic acids with (b) polyalkylene glycols, which are endcapped at one end, in the absence of a solvent and in the presence of polymerization inhibitors and esterification catalysts at not more than 160° C.

DE-A 25 16 933 discloses a process for the preparation of polymerizable esters from a polyalkylene glycol or an ether alcohol derivative of an alkylene glycol or polyalkylene glycol as the alcohol component and ethylenically unsaturated carboxylic acids, a mixture of the alcohol component and a hydrocarbon as a solvent being treated with sodium borohydride in order to decompose the peroxides contained in the alcohols. The alcohol component is then esterified, for example, with acrylic acid or methacrylic acid in the absence of oxygen and in the presence of an esterification catalyst and of a polymerization inhibitor, such as phenothiazine. The hydrocarbons used must be removed from the reaction mixture after the esterification.

Further processes for esterifying alkoxylated alcohols with acrylic acid or methacrylic acid are disclosed, for example, in EP-A-0 989 108 and EP-A-0 989 109. As is evident from the examples of this publication, here too the esterification is carried out in the presence of an entraining agent in order to remove the water formed in the esterification azeotropically from the reaction mixture. The entraining agent used is, for example, cyclohexane or benzene. After the end of the esterification, the entraining agent has to be removed from the reaction mixture.

In order to prepare esters from monoethylenically unsaturated carboxylic acids and polyglycol ethers, transesterification reactions can also be used in addition to the direct esterification of these compounds. For example, alkoxypolyglycol esters of acrylic acid or methacrylic acid are obtained by transesterification of methyl acrylate or ethyl acrylate with alkoxypolyglycols in the presence of a transesterification catalyst. According to DE-A-196 02 035, the reaction mixture is, for example, heated to a temperature of from 110 to 118° C. while passing in air, an azeotropic mixture of methyl acrylate and methanol being distilled off.

A further transesterification process is disclosed, for example, in U.S. Pat. No. 5,037,978, hafnium acetylacetonate being used as transesterification catalyst for the preparation of alkylpolyalkylene glycol (meth)acrylates.

The abovementioned processes have the disadvantage that the solvent used in each case has to be separated off in a further process stage after the esterification. In the known processes for the esterification or transesterification with polyalkylene glycols, there is furthermore insufficient reproducibility, so that products of greatly varying quality are obtained.

It is an object of the present invention to provide an improved esterification process for alkylpolyalkylene glycols, which is reproducible and takes place in the absence of organic solvents and in which the proportion of unesterified alkylpolyalkylene glycol is very low.

We have found that this object is achieved, according to the invention, by a process for the preparation of alkylpolyalkylene glycol esters of monoethylenically unsaturated carboxylic acids by esterifying (a) monoethylenically unsaturated carboxylic acids with (b) polyalkylene glycols which are endcapped at one end, in the absence of a solvent and in the presence of polymerization inhibitors and esterification catalysts at not more than 160° C., if the esterification is first carried out under atmospheric pressure or at up to 50 bar, the water formed in the esterification is then distilled off from the reaction mixture at from 10 to 500 mbar and the esterification is then continued under atmospheric pressure or at up to 50 bar.

Preferably, the esterification is carried out at from 100 to 140° C. up to the equilibrium reaction, and the pressure is then reduced to 50 to 200 mbar in order to remove from the reaction mixture the water formed in the esterification. Thereafter, the pressure is equilibrated with the atmosphere and the reaction mixture is then esterified again at from 100 to 140° C. under atmospheric pressure or at up to 50 bar until the equilibrium reaction is established. Since in certain cases the esterification is not complete after the resulting water has been removed once at from 10 to 500 mbar, the abovementioned sequence of process steps—esterifying and distilling off water under reduced pressure—can be carried out several times, for example from 2 to 5 times; preferably, water is distilled off from the reaction mixture only once at from 10 to 500 mbar.

Substances preferably used in the esterification are
(a) at least one monoethylenically unsaturated carboxylic acid of 3 to 5 carbon atoms and
(b) polyalkylene glycols endcapped at one end and of the formula $$HO\text{-}(A\text{-}O)_n\text{—}R^1 \qquad (I),$$

where
A is alkylene of 2 to 4 carbon atoms or —CH$_2$—CH$_2$—CH$_2$—CH$_2$—,
R$^1$ is C$_1$- to C$_{30}$-alkyl, aryl or C$_1$- to C$_{18}$-alkylphenyl and
n is an integer from 2 to 300.

Suitable compounds of component (a) are monoethylenically unsaturated carboxylic acids. Examples of these are acrylic acid, methacrylic acid, maleic acid and fumaric acid. If the anhydrides of these carboxylic acids are readily obtainable, for example maleic anhydride, the anhydrides too may be used for the esterification. Acrylic acid or methacrylic acid is preferably used from this group of compounds.

The compounds of group (b) are alkoxylated alcohols or phenols. One mole of an alcohol or phenol is reacted with from 2 to 300, preferably from 3 to 100, mol of an alkylene oxide of 2 to 4 carbon atoms. Examples of suitable alkylene oxides are ethylene oxide, propylene oxide and butylene oxides. Either a single alkylene oxide or a mixture of 2 or 3 different alkylene oxides can be subjected to the addition reaction with the alcohols or phenols. If at least two different alkylene oxides are used in the alkoxylation, the alkylene oxide units may be arranged in the alkoxylated products either randomly or in the form of blocks. Preferably used alkylene oxides for the alkoxylation are ethylene oxide and propylene oxide. The ethylene oxide adducts with C$_1$- to C$_{18}$-alcohols are particularly preferred.

Examples of alkoxylated alcohols are:
methylpolyethylene glycols which contain 5, 10, 20, 40, 100 or 200 ethylene oxide units and are obtainable by reaction of methanol with ethylene oxide, 5, 10, 20, 40, 100 or 200 mol of ethylene oxide being allowed to act on 1 mol of methanol, ethylpolyethylene glycol containing 15 ethylene oxide units, butylpolyethylene glycol having 5 ethylene oxide units, dodecylpolyethylene glycol having 40 ethylene oxide units,
isododecylpolyethylene glycol having 5 ethylene oxide units,
octadecylpolyethylene glycol having 5 ethylene oxide units,
stearylpolyethylene glycol having 5 ethylene oxide units
and the following alkoxylation products:
$C_{10}$-oxo alcohol ethoxylate having 12 ethylene oxide units
$C_{12}$–$C_{14}$-fatty alcohol ethoxylate having 3 ethylene oxide units
$C_{12}$–$C_{14}$-fatty alcohol ethoxylate having 8 ethylene oxide units
$C_{13}$-oxo alcohol ethoxylate having 3 ethylene oxide units
$C_{13}$-oxo alcohol ethoxylate having 8 ethylene oxide units
$C_{13}$-oxo alcohol ethoxylate having 20 ethylene oxide units
$C_{13}$–$C_{18}$-oxo alcohol ethoxylate having 3 ethylene oxide units
$C_{13}$–$C_{18}$-oxo alcohol ethoxylate having 7 ethylene oxide units
$C_{13}$–$C_{18}$-oxo alcohol ethoxylate having 30 ethylene oxide units
$C_{16}$–$C_{18}$-oxo alcohol ethoxylate having 11 ethylene oxide units
$C_{16}$–$C_{18}$-oxo alcohol ethoxylate having 25 ethylene oxide units
$C_{16}$–$C_{18}$-oxo alcohol ethoxylate having 50 ethylene oxide units
$C_{16}$–$C_{18}$-oxo alcohol ethoxylate having 80 ethylene oxide units
$C_9$-alkylphenol ethoxylate having 6 ethylene oxide units
$C_9$-alkylphenol ethoxylate having 20 ethylene oxide units
oleylamine ethoxylate having 12 ethylene oxide units
coconut fatty amine ethoxylate having 5 ethylene oxide units
tallow fatty amine ethoxylate having 15 ethylene oxide units
oleamide ethoxylate having 10 ethylene oxide units
methyl polyalkylene glycols which contain 10 ethylene oxide and 2 propylene oxide units in random distribution,
methylpolyalkylene glycols having a blockwise arrangement of 20 ethylene oxide and 5 propylene oxide units, which are obtainable by ethoxylating 1 mol of methanol with 20 mol of ethylene oxide and then subjecting the product to an addition reaction with 5 mol of propylene oxide,
methylpolypropylene glycol having 5 propylene oxide units
methylpolypropylene glycol having 40 propylene oxide units
allyl alcohol ethoxylate having 20 ethylene oxide units
allyl alcohol propoxylate having 5 propylene oxide units.

The molar ratio of (a) monoethylenically unsaturated carboxylic acids to (b) polyalkylene glycols endcapped at one end is, for example, from 1:1 to 100:1, preferably from 1:1 to 10:1, in the esterification.

In order to increase the rate of the esterification reaction, a catalyst is used. For example, all organic and inorganic acids may be used as catalysts. Examples are sulfuric acid, sulfurous acid, disulfuric acid, polysulfuric acids, sulfur trioxide, methanesulfonic acid, benzenesulfonic acid, $C_1$–$C_{30}$-alkylbenzenesulfonic acids, such as p-toluenesulfonic acid and dodecylbenzenesulfonic acid, naphthalenesulfonic acid, monoesters of sulfuric acid with $C_1$–$C_{30}$-alcohols, such as dodecyl sulfate, phosphoric acid, phosphorous acid, hypophosphorous acid, polyphosphoric acid, hydrochloric acid, perchloric acid, acidic ion exchangers and Lewis acids, such as boron trichloride, aluminum sulfate and iron trichloride. The catalyst is used, for example, in amounts of from 0.01 to 10, preferably from 0.05 to 5, % by weight, based on the total reaction mixture.

In the esterification, the components (a) and (b) are preferably used in anhydrous form. The complete removal of water from reaction mixtures containing polyalkylene glycols with the aid of distillation is difficult because only relatively small amounts, based on the polyalkylene glycol used, of water form in the esterification. For example, in the esterification of a methylpolyethylene glycol having 22 ethylene oxide units (molar mass about 1000), 18 g of water form, corresponding to 1.8% by weight. Since water forms hydrogen bridge bonds with polyalkylene glycols, the activity coefficient of the water decreases to about 0.3, i.e. the vapor pressure of the water above a polyalkylene glycol-containing mixture does not correspond to that of pure water but is substantially lower. The volatility of the water is therefore not sufficient to enable it to be distilled off at atmospheric pressure. Sufficient volatility of the water can be achieved only when the pressure above the reaction mixture is decreased to 500 mbar or less, preferably below 200 mbar. Under said pressures the resulting water boils and can be distilled off from the reaction mixture. Although the pressure could be reduced to 500 mbar or less during the entire duration of the esterification, unsaturated carboxylic acids, such as acrylic acid or methacrylic acid, also distill off continuously from the reaction mixture in this case. In the novel esterification of the components (a) and (b), a procedure is therefore adopted in which first the esterification is carried out at atmospheric pressure or preferably at up to 50 bar and only after partial esterification, for example from 30 to 90 mol %, is the water of reaction formed during this time distilled from the reaction mixture under a pressure of from 10 to 500 mbar and the pressure then increased again to atmospheric pressure or up to 50 bar. Distilling off water under 500 mbar or less takes, for example, from 1 minute to 5 hours, preferably from 10 minutes to 2 hours.

During the esterification, removal of water by distillation at 500 mbar or less and subsequent pressure increase to atmospheric pressure or up to 50 bar and further esterification of the components (a) and (b) are repeated several times. This procedure is particularly advantageous when very little unsaturated carboxylic acid is to be distilled off from the reaction mixture. For example, a reaction mixture comprising 1 mol of methylpolyethylene glycol having a molar mass of 1000 can be catalytically esterified with 4 mol of methacrylic acid at 1013 mbar for 4 hours without distilling off the resulting water. The equilibrium is established at which the esterification is about 85 mol % on the side of the ester. As soon as the esterification has proceeded at a temperature of, for example, from 100 to 140° C. to the equilibrium reaction, the pressure is reduced to 100 mbar, for example for 20 minutes, the resulting water of reaction is distilled off and the pressure is then equilibrated again with the atmosphere (in this case 1013 mbar). Distilling off the water now results again in an equilibrium mixture comprising the remaining 15 mol % of methylpolyalkylene glycol and the excess methacrylic acid, a degree of esterification of about 85 mol % resulting once again from the 15 mol % of polyether. The total esterification achieved is therefore 85+(0.15×85)=97 mol %, based on methylpolyethylene glycol.

At a molar ratio of 1:2, methylpolyethylene glycol having a molar mass of 1000 to methacrylic acid, an equilibrium esterification of about 60 mol % is established, for example at 3 bar at from 120 to 130° C. after 4 hours. If the pressure is then reduced to 100 mbar and the water formed in the esterification is distilled off under this pressure from the reaction mixture in the course of 30 minutes and the pressure increased again to 3 bar, then the degree of esterification of the reaction mixture after an esterification time of a further 3 hours is 60+(0.6×40)=84 mol %. If the water is distilled off in the course of 30 minutes at 100 mbar after an esterification time of a further 3 hours, the pressure increased to 3 bar and the reaction mixture esterified again for 3 hours at 120° C., a degree of esterification of 84+(0.6×16)=92 mol % is obtained.

To carry out the esterification at superatmospheric pressure, i.e. at up to 50, in particular up to 16 or up to 10, bar, may be advantageous because the volatility of the organic acids is reduced as a result. Particularly in the case of acrylic acid and methacrylic acid, the vapors established above the esterification mixture according to the partial pressure can lead to problems with undesired polymer formation. The polymer formation is caused by condensation of the vapors on the colder reactor cover and the polymerization of the droplets forming there. If the pressure above the esterification mixture is increased by forcing in inert gases, for example nitrogen or air, the evaporation of the organic acids is prevented.

A particular preliminary treatment of the polyalkylene glycols endcapped at one end is not required. In order to inhibit undesired polymerization during the esterification, polymerization inhibitors are used. Usually, phenothiazine, sulfur dioxide, hydroquinone monomethyl ether or 2,4-di-tert-butyl-para-cresol is used for this purpose. The amount of inhibitors is, for example, from 10 ppm to 1% by weight, based on the monoethylenically unsaturated carboxylic acids used in the esterification. Phenothiazine is generally used in amounts of from 0.05 to 5% by weight, based on the monoethylenically unsaturated carboxylic acids.

In the esterification, preferably
(a) acrylic acid, methacrylic acid, maleic acid, fumaric acid and/or maleic anhydride and
(b) polyalkylene glycols $C_1$–$C_4$-alkyl-endcapped at one end and having molar masses from 100 to 10,000.
are used.

The esterification of
(a) acrylic acid and/or methacrylic acid and
(b) polyethylene glycols methyl-endcapped at one end
is particularly preferred.

The temperatures during the esterification are not more than 160° C. and preferably from 100 to 140° C. The duration of the esterification is, for example, from 1 to 20, preferably from 5 to 15, hours. The esterification is preferably carried out using an excess of monoethylenically unsaturated carboxylic acid because the resulting reaction mixtures are used after the esterification for the preparation of copolymers. Such copolymers of, for example, methacrylic acid and methylpolyalkylene glycols are used as concrete plasticizers. For example, a copolymer of 4 mol of methacrylic acid and 1 mol of methylpolyethylene glycol methacrylate is prepared by using 5 mol of methacrylic acid and 1 mol of methylpolyethylene glycol (adduct of 20 mol of ethylene oxide with 1 mol of methanol) in the esterification and polymerizing the ester obtainable in the esterification without further purification.

The esterification is carried out in conventional apparatuses, for example in flasks, kettles or reactors which are provided with a stirrer or an apparatus for thorough mixing. For effective evaporation of the water from the reaction mixture, thin-film or falling-film evaporators may also be used. The water is distilled off via a distillation bridge or boiling line. In order to reduce the proportion of unsaturated carboxylic acids in the distillate, it may be advantageous to use a distillation column. It may contain a plurality of trays. For example, sieves, packings or bubble trays may be used as tray material. With the aid of such separation apparatuses, it is possible to separate water and monoethylenically unsaturated carboxylic acids better, i.e. to minimize the removal of volatile ethylenically unsaturated carboxylic acids by distillation.

The polymerization of the esters from the components (a) and (b) together with monoethylenically unsaturated carboxylic acids can be carried out, for example, as solution polymerization in water or in organic solvents in the presence of free radical polymerization initiators. The solids content of the copolymers in water or in the organic solvent is, for example, from 30 to 80% by weight. Suitable polymerization initiators are, for example, sodium peroxodisulfate, ammonium peroxodisulfate, hydrogen peroxide, tert-butyl peroctanoate and azo initiators. The copolymerization can, if required, be carried out in the presence of a polymerization regulator in order to establish the molecular weight of the copolymers within a specific range. Suitable regulators are, for example, sodium disulfide, sodium thiosulfate, sodium hypophosphite, phosphorous acid, mercaptoacetic acid, mercaptopropionic acid, mercaptoethanol, N-acetylcysteine and cysteine. The weight average molar masses of the copolymers are, for example, from 1000 to 100,000, preferably from 5000 to 50,000. The copolymers are preferably used in the form of aqueous solutions, as dispersants for concrete, cement slurries, mortar, plaster, calcium carbonate, calcium hydroxide, kaolin, mica, talc, magnesium carbonate, alumina, carbon black and for pigments.

EXAMPLE 1

Preparation of Ester 1

1000 g of methylpolyethylene glycol having a molar mass of 1000, 344 g (4 mol) of methacrylic acid, 0.4 g of phenothiazine and 13 g of p-toluenesulfonic acid were initially taken in a 2 liter reactor equipped with a stirrer and a distillation bridge having a collecting vessel for the distillate. The mixture was heated to 120° C. for 5 hours while passing through nitrogen. Thereafter, the nitrogen stream was stopped, a waterjet pump was connected and the pressure in the apparatus was reduced to 100 mbar for half an hour. During this time, a mixture of 10 g of water and 1 g of methacrylic acid distilled off. It was condensed in the receiver. After half an hour, the reduced pressure was eliminated and the esterification was continued for a further 3 hours at 120° C. while passing through nitrogen. The acid number of the mixture was 130 mg KOH per gram. The esterification product was polymerized without further purification.

EXAMPLE 2

478 g of methylpolyethylene glycol having a molar mass of 1000, 167 g of methacrylic acid, 6.5 g of p-toluenesulfonic acid and 0.17 g of phenothiazine were initially taken in a 2 liter reactor equipped with a stirrer and a distillation bridge. The mixture was heated to 120° C. for 2 hours while passing through nitrogen. A mixture of 3.3 g of water and 1.5 g of methacrylic acid was then distilled off under reduced pressure at 120 mbar for 30 minutes. The reduced pressure was then eliminated with nitrogen. The mixture was stirred for a further 2 hours under nitrogen, the pressure was then reduced again to 100 mbar for 30 minutes and a mixture of 2.9 g of water and 1.5 g of methacrylic acid was distilled off. The reduced pressure was eliminated with nitrogen and the esterification was continued for a further 2 hours while stirring. The pressure was reduced again to 100 mbar and a mixture of 0.2 g of water and 0.2 g of methacrylic acid was distilled off. The reduced pressure was then eliminated with nitrogen. The acid number of the reaction mixture was 131 mg KOH per gram.

We claim:

1. A process for the preparation of esters of polyalkylene glycols, said glycols being endcapped at one end, with monoethylenically unsaturated carboxylic acids or anhydrides comprising esterifying (a) monoethylenically unsaturated carboxylic acids or anhydrides with (b) polyalkylene glycols which are endcapped at one end, in the absence of a solvent and in the presence of polymerization inhibitors and esterification catalysts, at not more than 160° C., wherein the esterification is first carried out under atmospheric pressure or at up to 50 bar, wherein the water formed in the esterification is then distilled off from the reaction mixture at from 10 to 500 mbar, and wherein the esterification is then continued under atmospheric pressure or at up to 50 bar, where the esterification is additionally carried out at from 100 to 140° C. up to the equilibrium reaction, wherein the pressure is then reduced to 50 to 200 mbar in order to remove from the reaction mixture the water formed in the esterification, and wherein the reaction mixture is then esterified again at from 100 to 140° C. under atmospheric pressure or at up to 50 bar until the equilibrium reaction is established.

2. A process as claimed in claim 1, wherein the esterification and removal of water by distillation are repeated several times.

3. A process as claimed in claim 1, wherein (a) at least one monoethylenically unsaturated carboxylic acid of 3 to 5 carbon atoms and (b) polyalkylene glycols endcapped at one end and of the formula $$\text{HO-(A-O)}_n\text{—R}^1 \qquad (I),$$

where

A is alkylene of 2 to 4 carbon atoms or —$CH_2$—$CH_2$—$CH_2$—$CH_2$—, $R^1$ is $C_1$- to $C_{30}$-alkyl, aryl or $C_1$- to $C_{18}$-alkylphenyl and n is an integer from 2 to 300, are used in the esterification.

4. A process as claimed in claim 1, wherein (a) acrylic acid, methacrylic acid, maleic acid, fumaric acid and/or maleic anhydride and (b) polyalkylene glycols $C_1$- to $C_4$-alkyl-endcapped at one end and having molar masses of from 100 to 10,000 are used in the esterification.

5. A process as claimed in claim 1, wherein (a) acrylic acid and/or methacrylic acid and (b) polyethylene glycols methyl-endcapped at one end are used in the esterification.

6. A process as claimed in claim 1, wherein a molar ratio of from 1:1 to 100:1 for (a) monoethylenically unsaturated carboxylic acids to (b) monoalkylpolyalkylene glycols is established in the esterification.

7. A process as claimed in claim 1, wherein (a) monoethylenically unsaturated carboxylic acids and (b) monoalkylpolyalkylene glycols are used in the esterification at a molar ratio of (a) to (b) of 1:1 to 10:1.

* * * * *